United States Patent
Yamada et al.

(10) Patent No.: US 7,496,039 B2
(45) Date of Patent: Feb. 24, 2009

(54) DELAY GUARANTEE PATH SETTING SYSTEM

(75) Inventors: Hitoshi Yamada, Kawasaki (JP); Akiko Okamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 468 days.

(21) Appl. No.: 11/031,567

(22) Filed: Jan. 7, 2005

(65) Prior Publication Data

US 2006/0050635 A1    Mar. 9, 2006

(30) Foreign Application Priority Data

Sep. 3, 2004    (JP) .............................. 2004-257412

(51) Int. Cl.
*H04L 12/28*    (2006.01)

(52) U.S. Cl. ....................... 370/238; 370/229; 370/351; 709/223; 709/238

(58) Field of Classification Search ................. 370/229, 370/238, 351; 709/223, 238
See application file for complete search history.

(56) References Cited

U.S. PATENT DOCUMENTS

| | | | | |
|---|---|---|---|---|
| 6,044,075 | A * | 3/2000 | Le Boudec et al. | 370/351 |
| 6,088,333 | A * | 7/2000 | Yang et al. | 370/238 |
| 6,259,673 | B1 * | 7/2001 | Yoshihara et al. | 370/238 |
| 6,483,808 | B1 * | 11/2002 | Rochberger et al. | 370/238 |
| 6,542,469 | B1 * | 4/2003 | Kelley et al. | 370/238 |
| 6,697,333 | B1 * | 2/2004 | Bawa et al. | 370/238 |
| 6,836,463 | B2 * | 12/2004 | Garcia-Luna-Aceves et al. | 370/238 |
| 7,009,934 | B1 * | 3/2006 | Perkins et al. | 370/228 |
| 7,092,378 | B1 * | 8/2006 | O'Neil | 370/351 |
| 2003/0165117 | A1 * | 9/2003 | Garcia-Luna-Aceves et al. | 370/238 |
| 2004/0006613 | A1 * | 1/2004 | Lemieux et al. | 709/223 |
| 2004/0114569 | A1 * | 6/2004 | Naden et al. | 370/351 |
| 2004/0184483 | A1 * | 9/2004 | Okamura et al. | 370/477 |
| 2005/0160171 | A1 * | 7/2005 | Rabie et al. | 709/227 |
| 2005/0220026 | A1 * | 10/2005 | Dziong et al. | 370/237 |
| 2005/0265255 | A1 * | 12/2005 | Kodialam et al. | 370/252 |
| 2006/0050635 | A1 * | 3/2006 | Yamada et al. | 370/229 |
| 2006/0072543 | A1 * | 4/2006 | Lloyd et al. | 370/351 |

FOREIGN PATENT DOCUMENTS

| | | |
|---|---|---|
| JP | 07245626 | 9/1995 |
| WO | 0079730 | 12/2000 |

OTHER PUBLICATIONS

Turgay Korkmaz, et al., "An efficient algorithm for finding a path subject to two additive constraints", Computer Communications 25, 2002, pp. 225-238.
Zheng Wang, et al., "Quality-of-service routing for supporting multimedia applications" IEEE Journal on selected areas in communications, Sep. 7, 1996, pp. 1228-1234.

* cited by examiner

*Primary Examiner*—Huy D Vu
*Assistant Examiner*—Luat Phung
(74) *Attorney, Agent, or Firm*—Katten Muchin Rosenman LLP

(57) ABSTRACT

A delay guarantee path setting system, which sets a traffic transfer path in a network, based on a delay guarantee message that requests path setting that guarantees a bandwidth and a delay, and in the system, the network management node defines a weighted value for each link connecting between the nodes according to an ability to comply with a requested bandwidth and a requested delay in the delay guarantee message, and selects, upon receiving the delay guarantee message, a path that complies with requests in the received delay guarantee message, and has the weighted value of a link in the path which meets a predetermined condition.

9 Claims, 14 Drawing Sheets

DELAY GUARANTEE PATH SETTING SYSTEM

BACKGROUND OF THE INVENTION

1. Field of the present invention

The present invention relates to a delay guarantee path setting system for traffic transfer.

2. Description of the Related Art

Upon traffic transfer in a network, in order to guarantee Qos (quality of service) concerning a bandwidth or delay, it is necessary to search for such a route that meets a Qos request and set the obtained route as a path by referring configuration information or resources information of the network.

More specifically, a router in the network or network management control device has a database storing the configuration information or resources information of the network and searches the database for such a path that meets the QoS request in a given segment requested by a user. The path selected from among this search undergoes paths setting with an explicit route using a signaling protocol, for example, RSVP-TE (Resource reSerVation Protocol Traffic Engineering extension) for an MPLS (Multi-Protocol Label Switching) network. Traffic is then transferred to the path.

As a conventional art for searching for a path that complies with requested bandwidth and delay, there is a method in which a link having an available bandwidth smaller than the requested bandwidth is pruned from the network, and then a shortest path (minimum delay path) is detected where a target delay is set as a metric by using an existing SPF (Shortest Path First) algorithm such as Dijkstra's algorithm (see Non-patent document 1, for example).

In addition, another algorithm is exemplified, which defines a cost value for each link and detects a path that complies with a limitation on a delay and requires the lowest cost with a view to enhancing usability of network resources (bandwidth) as compared with the aforementioned method (see Non-patent document 2, etc.). This cost value denotes infrequency of selection of the link concerned. In general, a constant value is employed (the same value in all the links).

<Minimum Delay Path Selecting Method>

As a conventional art, there is a system where a link having an available bandwidth smaller than the requested bandwidth is checked off from a list of path setting targets in the network, and then a shortest path (minimum delay path) is detected, in which a target delay is set as a metric using an existing SPF algorithm (hereinafter, referred to as minimum delay path selecting method).

Referring to FIGS. 8, 9, 10, and 11, the minimum delay path selecting method as one of the conventional arts will be described below.

Prior to an explanation about the minimum delay path selecting method, given as an example is a network configuration of FIG. 8, where five transfer devices (nodes 1 to 5 in the figure) are connected to each other via communication media 12, 13, 23, 24, 35, and 45.

Links connecting between the respective nodes that constitute the network of FIG. 8 have specific delay times and available bandwidths, respectively. A link 12 connecting between the node 1 and the node 2, a link 13 connecting between the node 1 and the node 3, and a link 45 connecting between the node 4 and the node 5 each have a delay time of 10 ms (value (1) of FIG. 8) and an available bandwidth of 100 Mbps (value (2) of FIG. 8). A link 23 connecting between the node 2 and the node 3 and a link 24 connecting between the node 2 and the node 4 each have a delay time of 100 ms and an available bandwidth of 100 Mbps. A link 35 connecting between the node 3 and the node 5 has a delay time of 10 ms and an available bandwidth of 10 Mbps.

A delay time of the links is kept constant all the time. However, with regard to the available bandwidth, in response to each request, a bandwidth of a link on a requested path is used, and thus the available bandwidth is narrowed by the used amount. Note that for ease of explanation, the explanation is centered on one-way communication of the link as indicated by the arrow in the figure.

Referring now to FIGS. 10 and 11, description is given of an operation of a conventional system (hereinafter, referred to as a conventional system 1) in the network configuration shown in FIG. 8, which employs the minimum delay path selecting method as the conventional art. Note that the description is given with reference to an operation flow of a flowchart of FIG. 9 taking as an example a case of receiving a delay guarantee path setting request (request 1) aiming at a path having a bandwidth of 5 Mbps and a delay time of 200 ms or shorter, and a case of receiving, after the request 1 is received, a delay guarantee path setting request (request 2) aiming at a path having a bandwidth of 10 Mbps and a delay time of 50 ms or shorter.

FIG. 9 is a flowchart illustrative of a minimum delay path selecting method. FIG. 10 shows an operation example of the conventional system 1 in the case of receiving the delay guarantee path setting request (request 1) aiming at a path having a bandwidth of 5 Mbps and a delay time of 200 ms for connecting the node 1 and the node 5.

When receiving the request 1 (S901 of FIG. 9), the conventional system 1 detects any path having a requested bandwidth in a requested segment (in this example, the requested segment is assumed to start with the node 1 and end with the node 5). More specifically, the conventional system 1 selects a link having an available bandwidth (value (2) of FIG. 10) larger than a requested bandwidth, 5 Mbps, from among the links for connecting between the node 1 and the node 5. In other words, at this point, the system excludes links not having an available bandwidth corresponding to the requested bandwidth (5 Mbps) (S902 of FIG. 9). In the case of FIG. 10, there is no link short of the bandwidth.

With this operation, the conventional system 1 detects the following three paths.

Path 1: Node 1->Node 3->Node 5
Path 2: Node 1->Node 2->Node 3->Node 5
Path 3: Node 1->Node 2->Node 4->Node 5

Next, the conventional system 1 calculates the total delay time for each detected path, and selects a path having the minimum total delay time (S903 of FIG. 9).

Regarding the total delay time for each path, the total delay time is, in a path 1, 20 ms of which the link 13 accounts for 10 ms and the link 35 accounts for 10 ms. The total delay time is, in a path 2, 120 ms of which the link 12 accounts for 10 ms, the link 23 accounts for 100 ms, and the link 35 accounts for 10 ms. Similarly, the total delay time is, in a path 3, 120 ms. Thus, the path 1 whose total delay time is minimum is selected.

Then, the total delay time (path 1: 20 ms) in the path selected this time matches with the requested delay time (200 ms or shorter) (S904 of FIG. 9; YES), so the request is judged as acceptable (S905 of FIG. 9). As a result, the requested bandwidth, 5 Mbps, is reserved in the link 13 and link 35 on the path 1. Hence, the available bandwidth is reduced.

In addition, referring to FIG. 11, description is given below of an operation of the conventional system 1 in receiving a delay guarantee path setting request (request 2) aiming at a path having a bandwidth of 10 Mbps and a delay time of 50 ms or shorter for connecting the node 1 and the node 5. FIG. 11 shows an operation example of the conventional system 1 in receiving the request 2 in a state where the target bandwidth is reserved on the path 1 in the mode shown in FIG. 10. Therefore, the available bandwidths of the link 13 and the link 35 of FIG. 11 are narrowed by the requested bandwidth of the request 1 and thus decreased down to 95 Mbps and 5 Mbps, respectively.

Upon receiving the request 2 in the aforementioned state (S901 of FIG. 9), the conventional system 1 detects a path having the requested bandwidth among the requested paths as in the case of receiving the request 1. More specifically, the conventional system 1 selects a link, among links connecting between the node 1 and the node 5, which has an available bandwidth larger than the requested bandwidth, 10 Mbps (value (2) of FIG. 11). In other words, at this point, the conventional system 1 excludes a link not having an available bandwidth equivalent to the requested bandwidth (10 Mbps). In short, the link 35 has only an available bandwidth of 5 Mbps and therefore is pruned upon selecting a path (S902 of FIG. 9).

Accordingly, the path detected by the conventional system 1 is the path 3 alone.

Path 3: Node 1->Node 2->Node 4->Node 5

The total delay time of the path 3 counts up to 120 ms (S903 of FIG. 9). However, the total delay time of the path 3 is longer than the requested delay time of 50 ms (S904 of FIG. 9; NO), and does not comply with the requested delay. Hence, this request is judged unacceptable (S906 of FIG. 9).

<Delay Limitation Minimum Hop Path Selecting Method>

As another conventional art, there is an algorithm for defining a cost value for each link and detecting a path that complies with limitations on a delay and has a minimum cost value. With this conventional art, a constant cost value is employed (the same value for all the links). This conventional art provides a method (hereinafter, referred to as delay limitation minimum hop path selecting method) of selecting a path that complies with the limitations on the bandwidth and delay and has the minimum number of hops by setting the constant cost value.

Here, referring to FIGS. 13 and 14, this delay limitation minimum hop path selecting method employed in the conventional art is described below based on an operation flow of a flowchart of FIG. 12. FIG. 12 is a flowchart illustrative of the delay limitation minimum hop path selecting method. Prior to an explanation thereof, for ease of comparison, the same network configuration and case (in receiving the request 1 and request 2) as the aforementioned conventional system 1 are employed.

FIGS. 13 and 14 each show an operation example of a conventional system employing the delay limitation minimum hop path selecting method used in the conventional art (hereinafter, referred to as a conventional system 2). As shown in FIGS. 13 and 14, the delay time (value (1) of the figures) and available bandwidth (value (2) of the figures) of the respective links are the same as those in the conventional system 1; however, the conventional system 2 differs from the conventional system 1 in that cost values (values (3) of the figures) are additionally set.

FIG. 13 shows an operation example of the conventional system 2 upon receiving the request 1 (delay guarantee path setting request aiming at a path having a bandwidth 5 Mbps and delay time 200 ms) for connecting the node 1 and the node 5.

The conventional system 2 detects, in response to the request 1 (S911 of FIG. 12) a path that has a requested bandwidth within a requested segment (segment started with the node 1 and the ended with the node 5) (S912 of FIG. 12). This operation is similar to the conventional system 1.

The conventional system 2 detects the following three paths.

Path 1: Node 1->Node 3->Node 5
Path 2: Node 1->Node 2->Node 3->Node 5
Path 3: Node 1->Node 2->Node 4->Node 5

Next, the conventional system 2 calculates the total delay time for each detected path, and detects among the paths, a path having a delay time equal to or shorter than a requested delay time of 200 ms.

Regarding the total delay time for each path, the total delay time is 20 ms in the path 1, 120 ms in the path 2, and 120 ms in the path 3. Therefore, all the paths comply with the requested delay time (200 ms) or shorter (S913 of FIG. 12; YES).

Subsequently, the conventional system 2 calculates a sum of cost values of the links on the respective paths (total cost value) (S915 of FIG. 12). In short, in the path 1, the cost value of the link 13 is 1 and the cost value of the link 35 is 1, so the total cost value equals 2. Similarly, the total cost value of the path 2 equals 3 and the total cost value of the path 3 equals 3, respectively.

Then, the conventional system 2 selects a path having the minimum total cost value, out of the paths that comply with a requested delay time, that is, the path 1 (S916 of FIG. 12), and allows acceptance of the request 1 (S917 of FIG. 12). As a result, the link 13 and link 35 on the path 1 are occupied by the requested bandwidth of 5 Mbps, and thus decrease their available bandwidths.

In addition, referring to FIG. 14, description is given below of an operation of the conventional system 2 in receiving, afterward, the request 2 (delay guarantee path setting request aiming at a path having a bandwidth 10 Mbps and delay time 50 ms or shorter) for connecting the node 1 and the node 5. FIG. 14 shows an operation example of the conventional system 2 upon receiving the request 2 in a state where the requested bandwidth is reserved on the path 1 in the mode shown in FIG. 13. Therefore, the available bandwidths of the link 13 and link 35 are reduced by the requested bandwidth of the request 1, and reach 95 Mbps and 5 Mbps, respectively.

The conventional system 2 detects, in receiving the request 2 (S911 of FIG. 12) under the aforementioned state, a path that complies with the requested bandwidth, out of the requested paths as in the case of receiving the request 1 (S912 of FIG. 12).

Thus, the path detected by the conventional system 2 is the path 3 alone.

Path 3: Node 1->Node 2->Node 4->Node 5

Here, the total delay time of the path 3 equals 120 ms. However, the total delay time of the path 3 is longer than the requested delay time, 50 ms (S913 of FIG. 12; NO), and thus does not comply with the requested delay time, so the request is judged unacceptable (S914 of FIG. 12).

Note that the conventional art documents concerning the present invention are as follows. The conventional art documents are "Japanese Patent Application Laid-Open Publication No. 07-245626", "Japanese Patent Application Laid-Open Publication No. 2003-502941", "Zheng Wang and Jon Crowcroft, "Quality of Service Routing for Supporting Multimedia Applications", IEEE Journal on Selected Areas in Communications, Vol. 14, no. 7, pp. 1228-1234, September 1996", and "Turgay Korkmaz, Marwan Krunz, and Spyros Tragoudas, "An efficient algorithm for finding a path subject to two additive constraints", Computer Communications Journal, Vol. 25, No. 3, pp. 225-238, February 2002".

However, in the minimum delay path selecting method (conventional system 1) of the conventional art, the minimum delay path is always selected. Hence, a link with a smaller delay is more likely to be selected and thus its bandwidth is concentratedly used. If some link leaves no available bandwidth, which narrows the list of candidate paths to be selected, resulting in a low possibility that the request is accepted.

The minimum delay path is also selected with respect to a request that imposes not so strict limitations on a delay. As a result, the bandwidth of the minimum delay path is used, resulting in a low possibility that any request that imposes more strict limitations on the delay is accepted thereafter.

In the delay limitation minimum hop path selecting method of another conventional art (conventional system 2), if a request aiming at the same required bandwidth is accepted, a path having the smaller number of links is selected. Thus, there is an advantage that the use amount of bandwidth throughout the network can be minimized. However, an available bandwidth in each link is out of consideration, so a link insufficient in free bandwidth may be selected, leading to nonuniform use amounts of bandwidth. As a result, a call loss (in case that the request is not accepted because of failing in detection of a path that meets requests) increases.

In this way, in searching and setting a path that guarantees bandwidth and delay, the conventional art for selecting the minimum delay path or delay limitation minimum hop path is inefficient in usability of network resources, and suffers from a problem in that a larger number of delay guarantee path setting requests cannot be accepted.

SUMMARY OF THE INVENTION

It is an object of the present invention to improve a usability of network resources in a network that guarantees bandwidth and delay. More specifically, it is an object of the present invention to provide a delay guarantee path setting system that enables reduction in call loss probability and acceptance of more delay guarantee path setting requests in the network.

In order to solve the aforementioned problems, the present invention adopts the following configuration. The present invention relates to a delay guarantee path setting system including at least one network management node of a plurality of nodes in a network, where the plurality of nodes are connected, wherein the network management node sets a traffic transfer path based on a delay guarantee message that requests a path setting that guarantees a bandwidth and a delay in a segment connecting two of the plurality of nodes, comprises a pre-process section defining a weighted value for each of links connecting between the plurality of nodes according to an ability to comply with a requested bandwidth and a requested delay in the delay guarantee message, a link information storage section storing the delay, the available bandwidth, and the weighted value for each of the links, and a path setting section selecting, upon receiving the delay guarantee message, a path to comply with the segment, the requested delay, and the requested bandwidth in the received delay guarantee message, the path having the weighted value, to meet a predetermined condition, of the links in the path, and setting the path as the traffic transfer path.

According to the present invention, a weighted value is defined in advance for each link connecting between nodes according to an ability to respond to requested bandwidth and requested delay in a delay guarantee message.

Then, in addition to the weighted value, delay and available bandwidth are stored in association with each link.

Upon receiving the delay guarantee message indicative of a request to set a path that guarantees a requested bandwidth and delay in a segment connecting two of nodes, selection/setting of a traffic transfer path are carried out using request information in the message and the weighted value.

Therefore, according to the present invention, it is possible to select/set the traffic transfer path according to an ability to meet a prospective delay request. This allows, in turn, more delay guarantee messages to be accepted while making efficient use of network resources and reducing a call loss probability.

Further, the present invention defines the weighted value for each of the links according to a difference between the total delay of a minimum delay path having a minimum sum of the delays of each of the link in the path connecting two of the plurality of nodes and the total delay of the minimum delay path exclusive of the links.

In the present invention, a weighted value of a target link is set to correspond to a difference in total delay time between the minimum delay path in the case of counting in the target link and the minimum delay path in the case of counting out the target link.

Therefore, according to the present invention, it is possible to define the ability to comply with the delay guarantee message for each link.

Also, in the present invention, the weighted values of the respective links are calculated for each of the segments in the network, and all the calculated results are summed and set as the weighted values of the target link.

Therefore, according to the present invention, the weighted value of each link can be defined as an ability to comply with the delay guarantee message targeted at all the segments in the network.

Also, the present invention includes a cost value calculating section for calculating a cost value by dividing the weighted value of each link by the available bandwidth of the link, selects, in receiving the delay guarantee message, a path having the minimum total cost value derived by summing the cost values of the respective links on the path, among the paths that reply with the segment, requested delay, and requested bandwidth in the received delay guarantee message, and sets the path as a traffic transfer path.

In the present invention, path setting/selection are carried out according to cost values of the respective links. This cost value is obtained by dividing the weighted value for each link by the available bandwidth.

Therefore, the links having smaller available bandwidth are less likely to be selected, whereby it is possible to make efficient use of the network resources.

It should be noted that the present invention may provide a program that realizes any one of the aforementioned functions. Also, in the present invention, the program may be recorded on a computer readable storage medium.

According to the present invention, a system is realized, which enables reduction in call loss probability and acceptance of more delay guarantee path setting requests.

DESCRIPTION OF THE PREFERRED EMBODIMENTS

Hereinafter, an embodiment of the present invention will be described with reference to the drawings. Structures of the embodiment are given by way of example, and the present invention is not limited to the structures of the embodiment.

<System Configuration>

Figure 1:
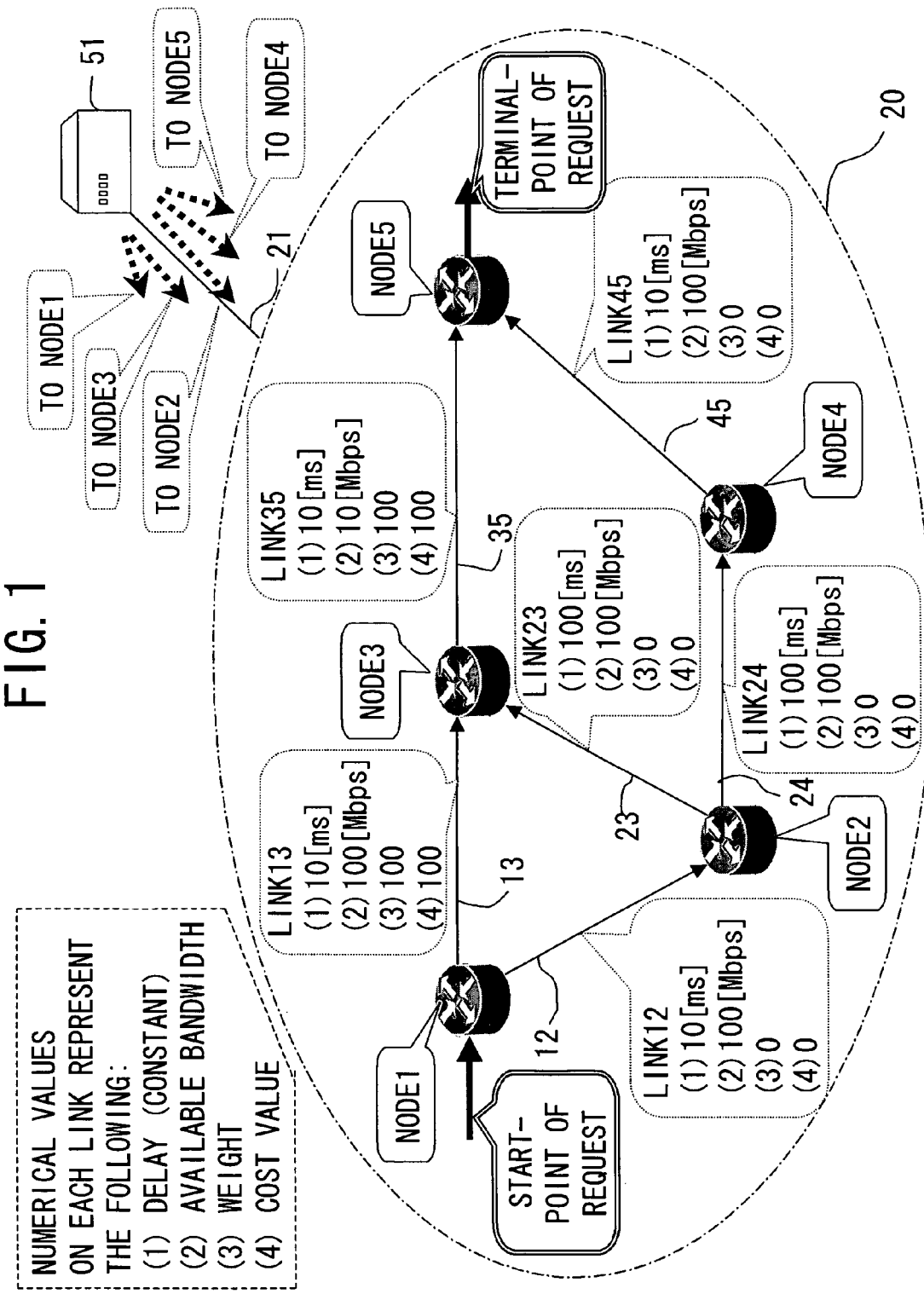
FIG. 1 is a view showing a network configuration in a system according to an embodiment of the present invention.

FIG. 1 shows a network configuration of a system according to an embodiment of the system of the present invention. Five transfer devices (nodes 1 to 5 of FIG. 1) are connected to one another through communication media 12, 13, 23, 24, 35, and 45 to constitute a network 20. A network management control device 51 is connected to the network 20 for managing the network (hereinafter, referred to as NMS 51). The NMS 51 is connected to the respective nodes constituting the network 20 through a predetermined management network for monitoring and controlling the respective nodes. The network management control device (NMS) 51 corresponds to a network management control node and a network management apparatus of the present invention.

Figure 8:
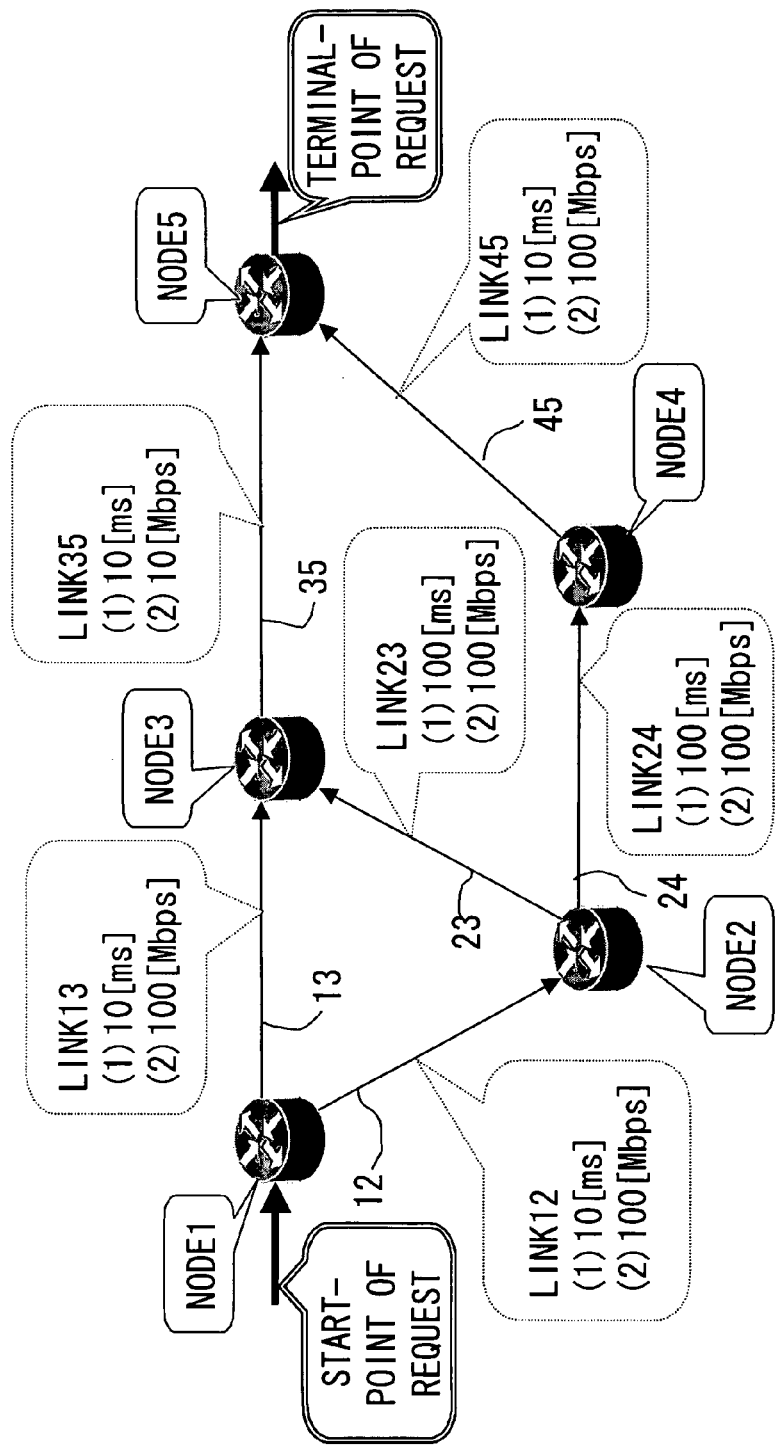
FIG. 8 is a view showing a network configuration of a conventional art.
Figure 9:
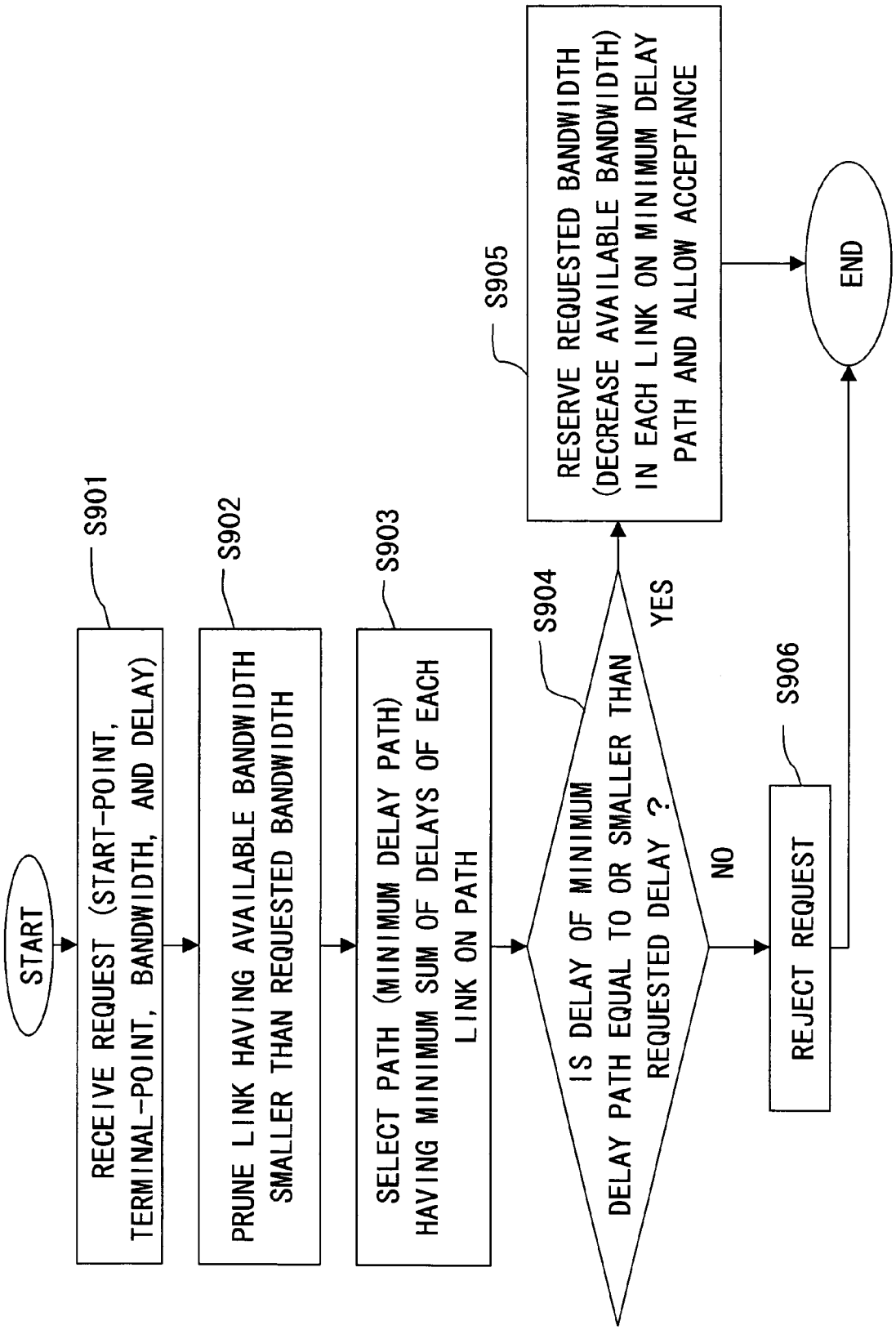
FIG. 9 is a flowchart showing a minimum delay path selecting system of a conventional art.

Links connecting between the respective nodes each have specific delay time and available bandwidth. A link 12 for connecting between the node 1 and the node 2, a link 13 for connecting between the node 1 and the node 3, and a link 45 for connecting between the node 4 and the node 5 each have a delay time of 10 ms (value (1) of FIG. 1) and available bandwidth of 100 Mbps (value (2) of FIG. 1). A link 23 for connecting between the node 2 and the node 3 and a link 24 for connecting between the node 2 and the node 4 each have a delay time of 100 ms and available bandwidth of 100 Mbps. A link 35 for connecting between the node 3 and the node 5 has a delay time 10 ms and available bandwidth of 10 Mbps. It should be noted that the respective nodes and links between the nodes of FIG. 1 have the same configuration as those of the conventional art shown in FIG. 8 to aid in the understanding of a difference from the conventional art.

The NMS 51 is constituted of a CPU (Central Processing Unit), a memory, an input/output interface, or the like and manages information about the nodes 1 to 5 and links 12, 13, 23, 24, 35, and 45 constituting the network 20. The information managed by the NMS 51 includes, for example, the foregoing delay time and available bandwidth for each link. The NMS 51 stores these pieces of management information in its own memory.

Also, when receiving a request to connect between a node as a start-point node and a node as a terminal-point node according to a required bandwidth and permissible delay time, that is, a delay guarantee path setting request, the NMS 51 selects a path that meets the request and instructs the respective nodes to reserve the requested bandwidth. In short, the NMS 51 sends an instruction to set a traffic transfer path in the respective nodes. This instruction is made via a signaling protocol such as RSVP-TE (Resource reSerVation Protocol Traffic Engineering extension and so on). The delay guarantee path setting request corresponds to a delay guarantee message of the present invention.

The respective nodes reserve the requested bandwidth in the requested link in response to the instruction from the NMS 51.

In this embodiment, the system is configured by the respective nodes of the network 20 and the NMS 51.

<<Weighted Value of Each Link>>

Besides, the links connecting between the respective nodes have weighted values (values (3) of FIG. 1) defined in advance. Those values are defined in start-up of the system or in changing the network configuration due to the pre-processing of the NMS 51. Then, the weighted values of the respective links are managed by the NMS 51 like the delay time and available bandwidth.

The weighted value of each link will be described below.

The system carries out path setting using a cost value for each link in consideration of delay characteristics with a view to accepting as many the delay guarantee path setting requests as possible. However, it takes much time to respond to the requests if each request requires complicated calculation. As a result, a larger number of requests cannot be accepted under time constraints. To that end, in consideration of the delay characteristics, the weighted values are defined in advance for each link.

The weighted value for each link in the system represents to an ability of each link to meet the delay guarantee path setting request. To elaborate, the weighted value is defined as follows.

In the system, one link as a target of weighted value calculation is first selected. Then, a given segment including the link in question (a pair of a start-point node and a terminal-point node, hereinafter referred to as input/output pair) is specified, followed by searching for a path having the minimum total delay time, out of the paths connecting between the start-point node and the terminal-point node, i.e., a so-called minimum delay path (set as a minimum delay path 1). The path must be most effective for meeting the request.

Next, a minimum delay path (set as a minimum delay path 2) in the segment from the start-point node to the terminal-point node is again searched for while counting out the link as a target of weighted value calculation. Excluding the link should make the total delay time of the links on the minimum delay path 2 longer than the total delay time of the links on the minimum delay path 1, which was obtained upon the first calculation.

However, if a difference therebetween is too large, the delay in the minimum delay path 2 is too large, resulting in a low probability of meeting the delay guarantee path setting request. More specifically, it is presumed that the link now targeted for weighted value calculation is important for meeting the request for a delay in the input/output pair. Accordingly, the link preferably has the higher ability to meet the delay guarantee path setting request and the larger weighted value.

In this way, the system defines the weighted value as the ability to meet the delay guarantee path setting request for each link.

The weighted value for each link may be, as descried early, defined according to a difference between the delay time of the minimum delay path in a given segment and the delay time of the minimum delay path exclusive of the target link.

In addition, this calculation is performed on every segment and the calculation results may be summed and defined as a weighted value for each link. With this operation, the weighted value for each link can be defined as the ability to meet the delay guarantee message targeted to every segment in the network.

<<Cost Value in Each Link>>

The system carries out path selecting using a cost value (value (4) of FIG. 1) for each link in consideration of delay characteristics with a view to accepting as many the delay guarantee path setting requests as possible. In short, the cost value means a value used for, in which case detecting plural paths that comply with the requested bandwidth and requested delay time of the delay guarantee path setting request, selecting the target path. Therefore, the cost value should be set in consideration of the delay characteristics of the network. The cost value is calculated for each link by the NMS 51 upon selecting the path.

The weighted value defined for each link represents to an ability to meet a prospective delay request. It is also advisable that the link having the larger weighted value be kept. Therefore, in this embodiment, the cost value for each link (value (4) of FIG. 1) is used for the weighted value in each link as it is.

It should be noted that the cost value may be defined in proportion to the weighted value. Also, a value obtained by dividing the weighted value of each link by the available bandwidth of the link may be set as the cost value such that the link having a smaller available bandwidth is less likely to be selected.

<Operation Example>

Figure 2:
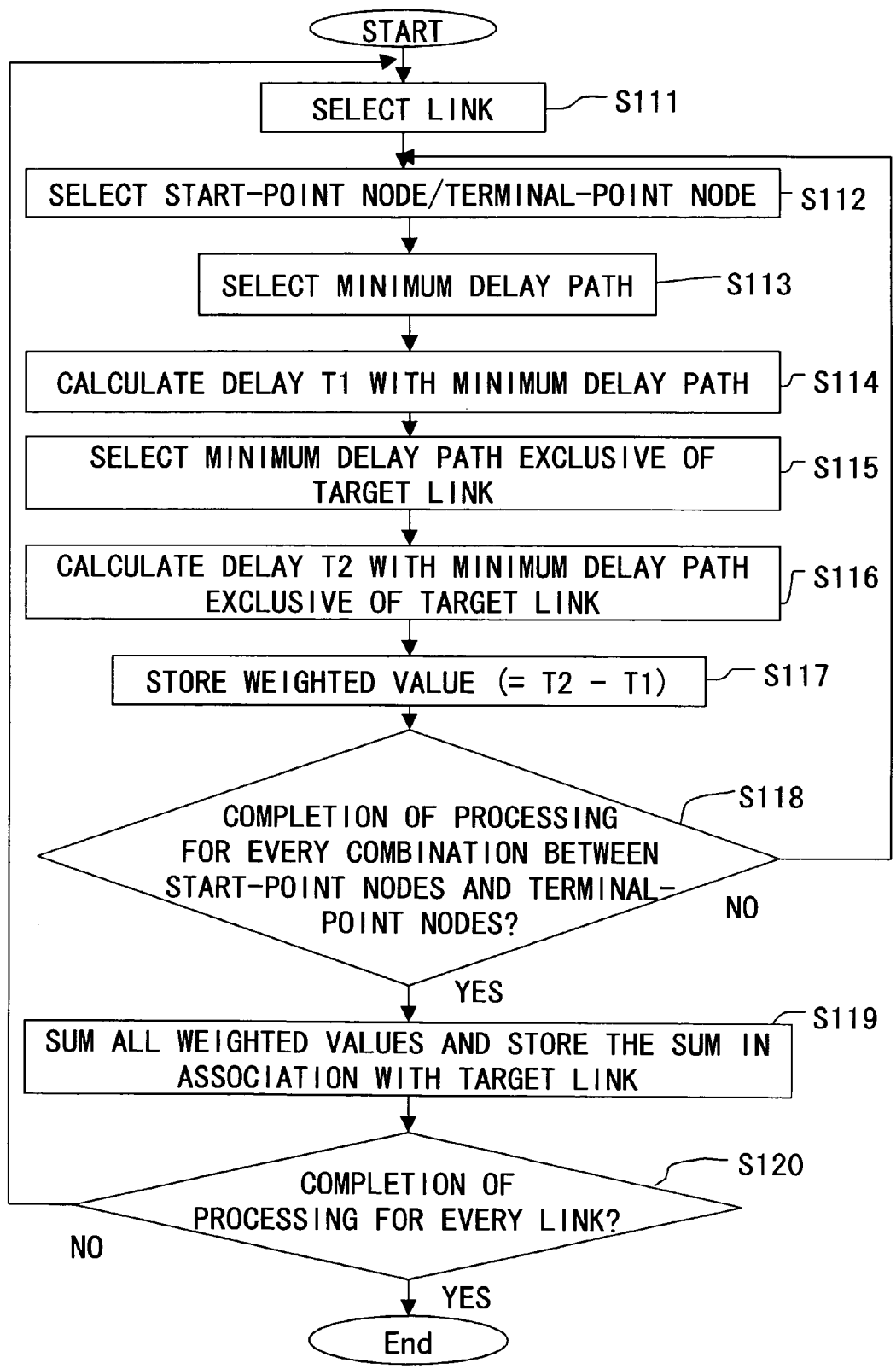
FIG. 2 is a flowchart showing an operation example of pre-processing of the system according to the present invention.
Figure 3:
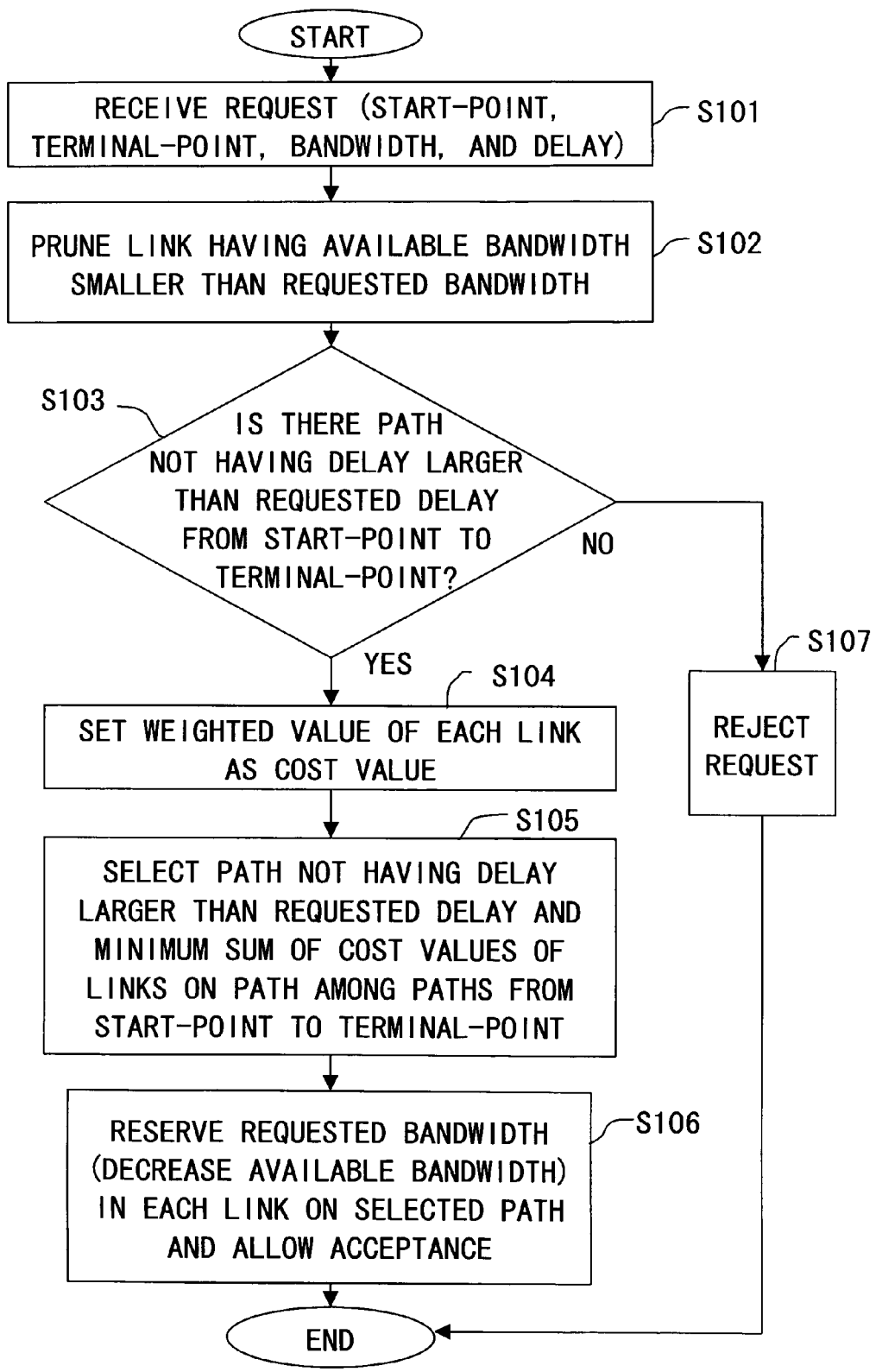
FIG. 3 is a flowchart showing an operation example of path setting of the system according to the present invention.
Figure 4:
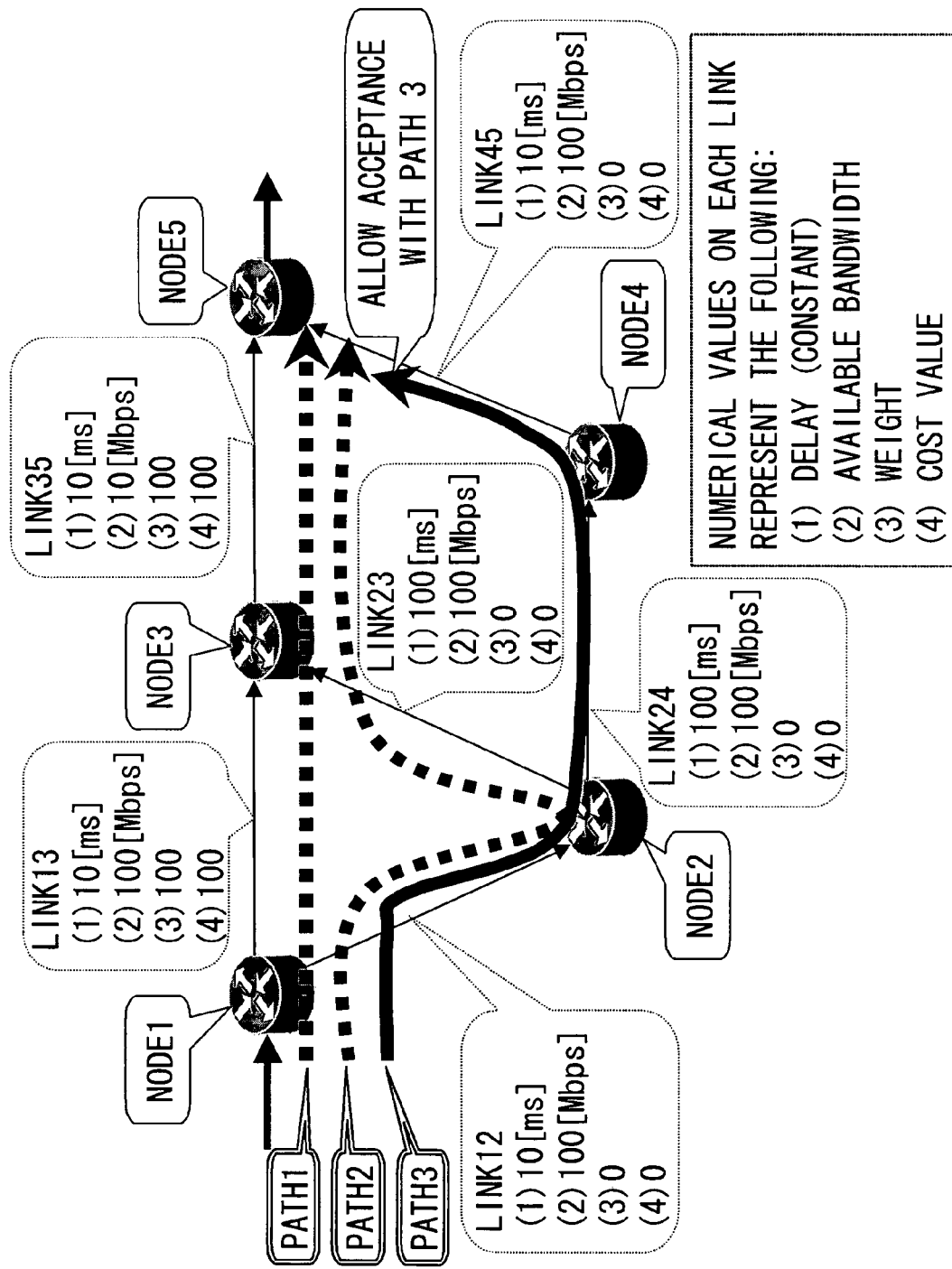
FIG. 4 is a schematic diagram showing an operation example of the system according to the embodiment of the present invention in receiving a request 1.
Figure 5:
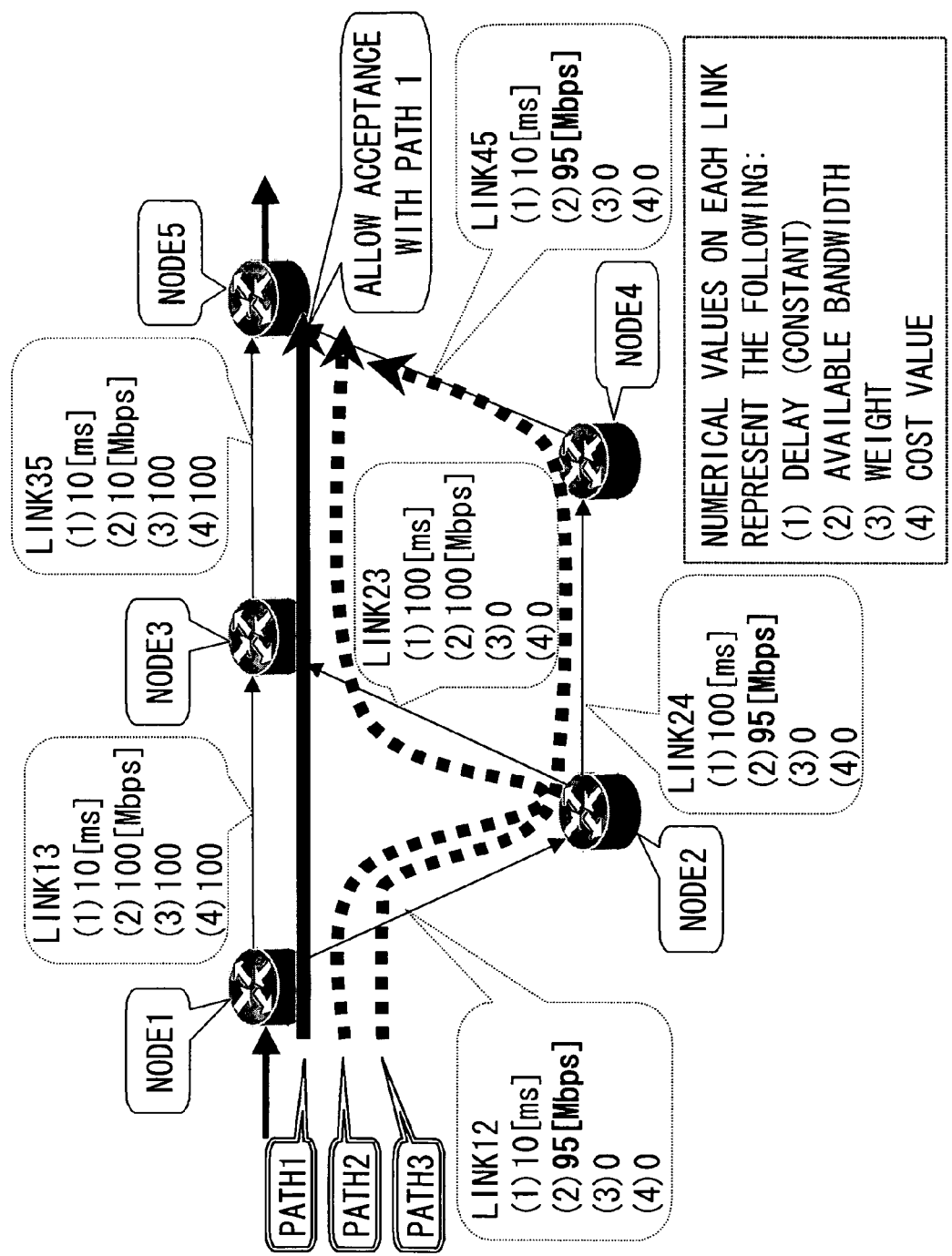
FIG. 5 is a schematic diagram showing an operation example of the system according to the embodiment of the present invention in receiving a request 2.

Next, referring to FIGS. 1 to 5, an operation example of the system according to the embodiment of the present invention will be described below. FIGS. 2 and 3 are flowcharts illustrative of an operation example in path setting of the system according to the present invention. FIGS. 4 and 5 schematically show an operation example in receiving a request 1 and a request 2 in the system according to the embodiment of the present invention. The respective processings of FIGS. 2 to 5 are realized as a network control program running on the NMS 51.

<Pre-Processing>

The system carries out the pre-processing in start-up of the system or in changing the network configuration. The system confirms the weighted value of each link in the target network 20 through the pre-processing. In this embodiment, the pre-processing is executed by the NMS 51.

Referring to FIG. 1, the pre-processing will be described below based on a process flow of FIG. 2. In this example, for ease of explanation, the explanation is centered on one-way communication of each link as indicated by the arrow of FIG. 1. In practice, two-way communication may be performed for each link. How to calculate the weighted value will be described using the link 13 as an example.

First, a link as a target of weighted value calculation is selected (S111 of FIG. 2). In FIG. 1, for example, the link 13 is selected. Then, any start-point node and terminal-point node are selected out of nodes that may serve as a start-point node and a terminal-point node in the network 20 (S112 of FIG. 2). This explanation is directed to a segment started with the node 1 and ended with the node 5.

Next, any possible paths (route) for connecting between the start-point node 1 and the terminal-point node 5 are detected as listed below.

Path 1: Node 1->Node 3->Node 5
Path 2: Node 1->Node 2->Node 3->Node 5
Path 3: Node 1->Node 2->Node 4->Node 5

Among those paths, a minimum delay path is selected (S113 of FIG. 2). In other words, the path 1 is selected, and the total delay time equals 20 ms (S114 of FIG. 2; T1=20 ms).

Next, a minimum delay path is detected once more exclusive of the selected link (link 13). More specifically, the path exclusive of the link 13 corresponds to the path 2 or path 3, and the total delay times of these paths are both equal to 120 ms. Hence, as the minimum delay path, the path 2 and path 3 are detected (S115 of FIG. 2).

The total delay time in the path 2 and path 3 equals 120 ms (S116 of FIG. 2; T2=120 ms).

A value calculated by subtracting from the total delay time of the minimum delay path exclusive of the link 13, the total delay time of the minimum delay path inclusive of the link 13 (120−20=100) is set to the weighted value of the link 13 and temporarily stored (S117 of FIG. 2).

The foregoing processing is effected on every possible combination of start-point nodes and terminal-point nodes in the network 20. Then, if all the combinations undergo the processing (S118 of FIG. 2; YES), the weighted values temporarily stored are summed and stored as a weighted value of the target link (S119 of FIG. 2). This embodiment is exclusively directed to a segment started with the node 1 and the ended with the node 5, and a weighted value of the link 13 is taken as 100.

Those processings are carried out on every link constituting the network 20.

<Path Set Processing>

Figure 10:
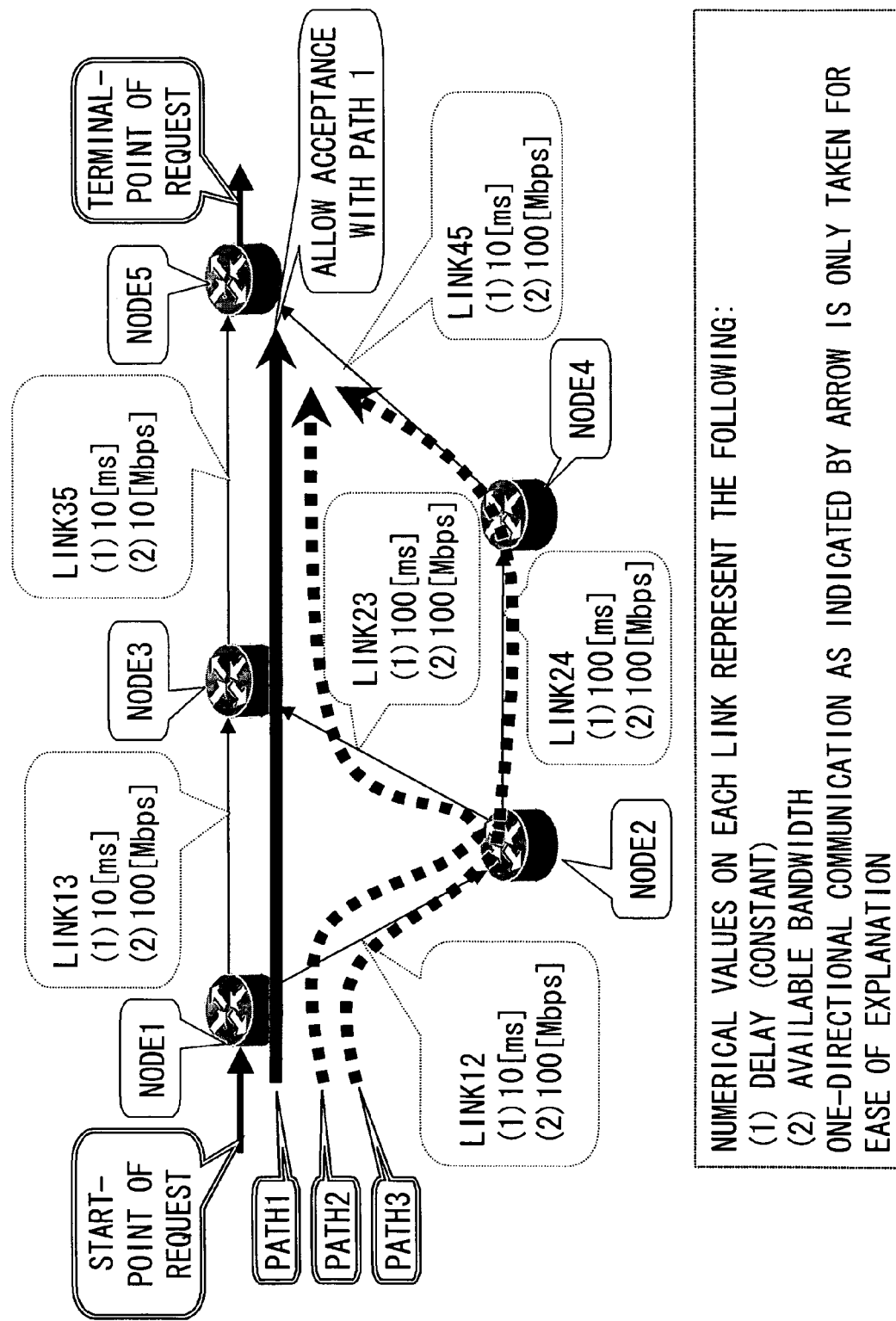
FIG. 10 is a view showing an operation example of the minimum delay path selecting system as the conventional art in receiving the request 1.
Figure 11:
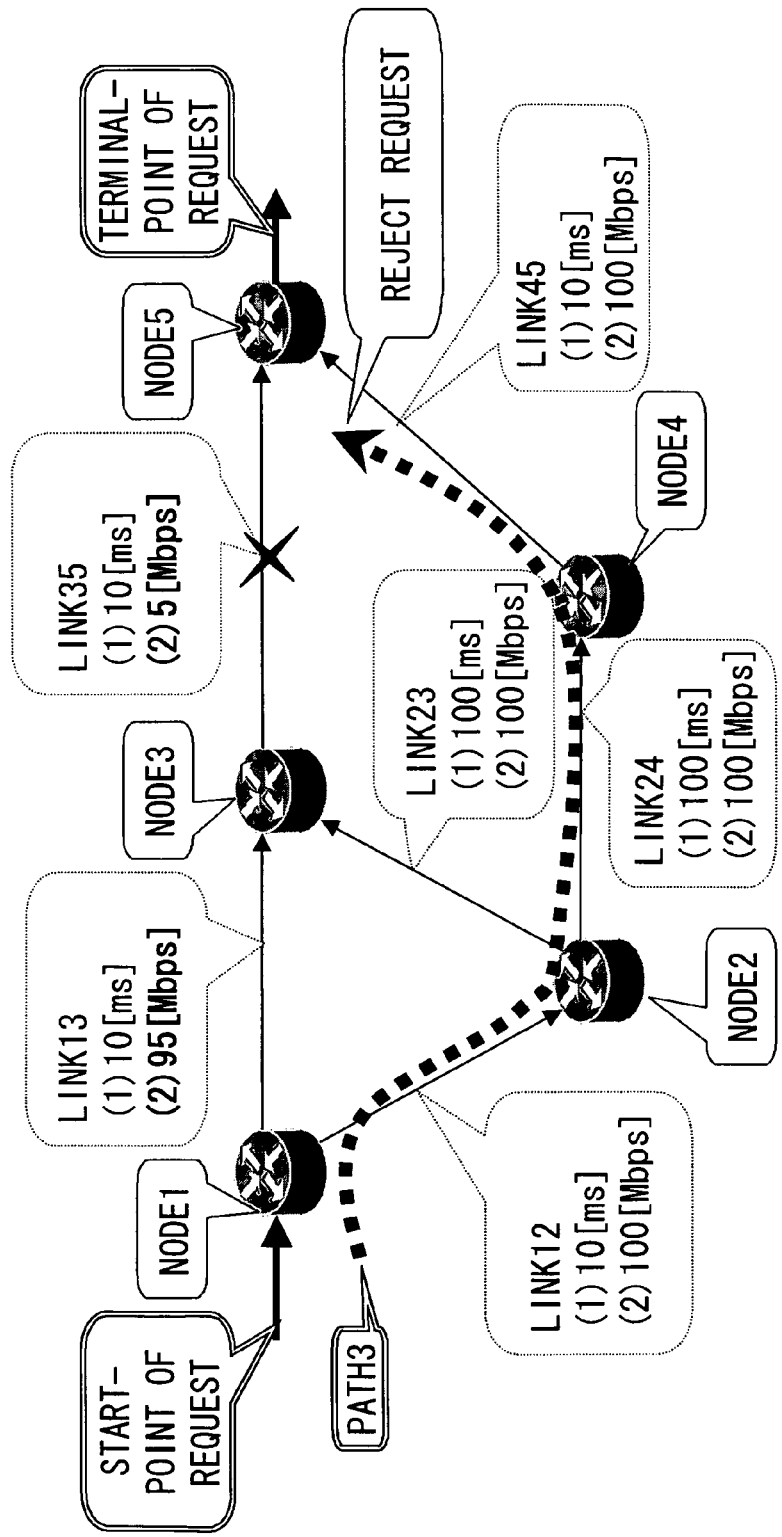
FIG. 11 is a view showing an operation example of the minimum delay path selecting system as the conventional art in receiving the request 2.
Figure 12:
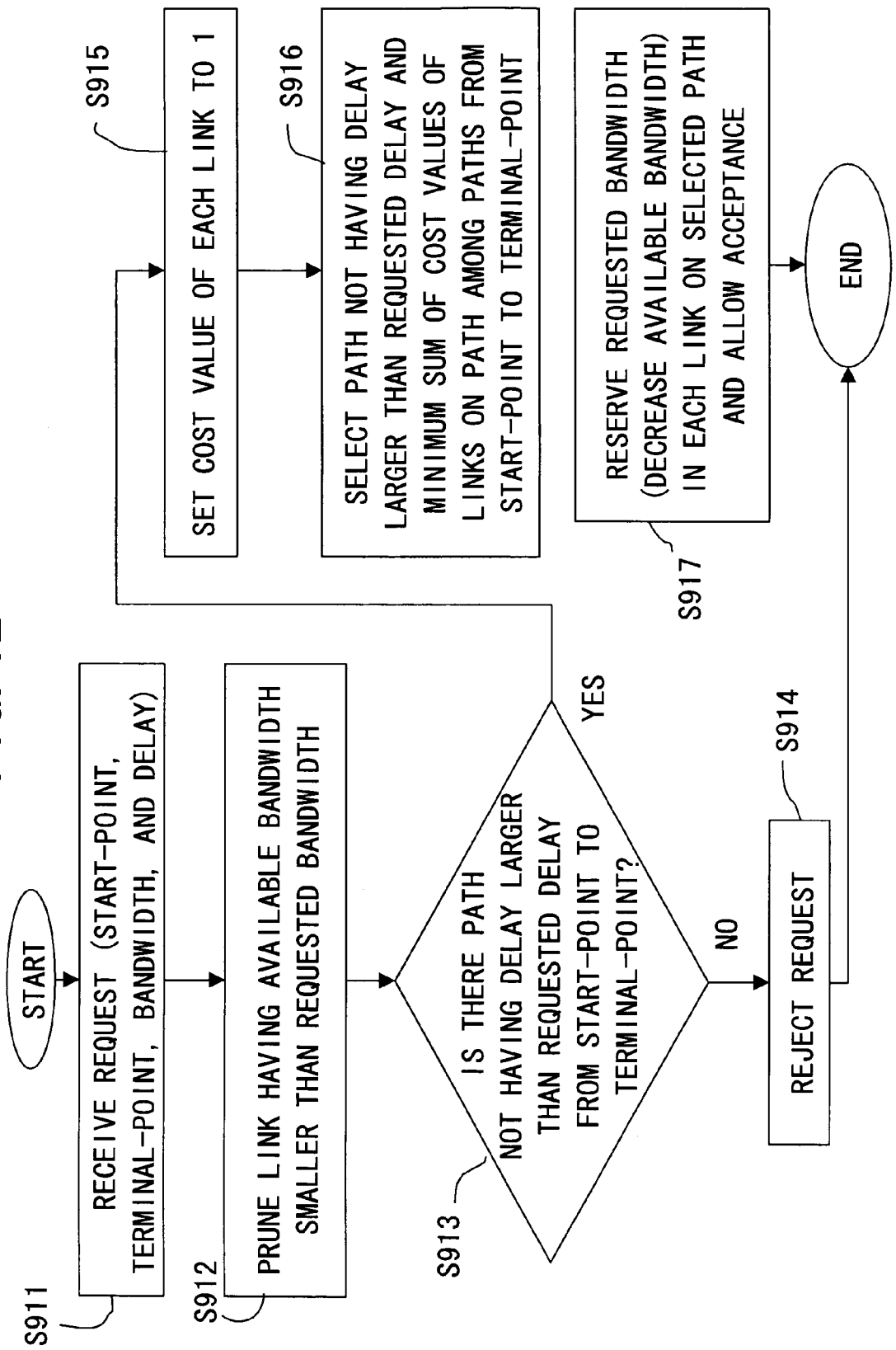
FIG. 12 is a flowchart showing a delay limitation minimum hop path selecting system of a conventional art.
Figure 13:
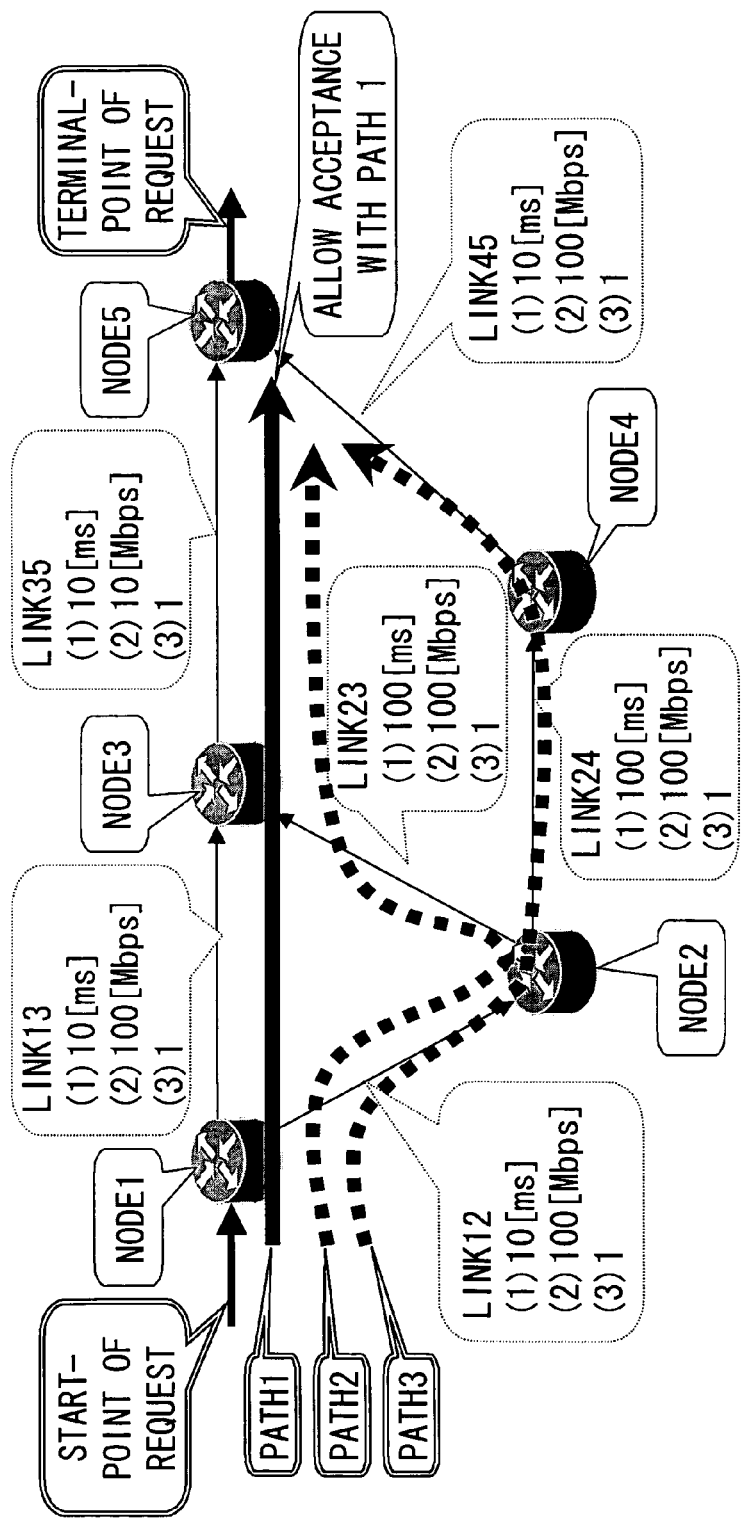
FIG. 13 is a view showing an operation example of the delay limitation minimum hop path selecting system of the conventional art in receiving the request 1.
Figure 14:
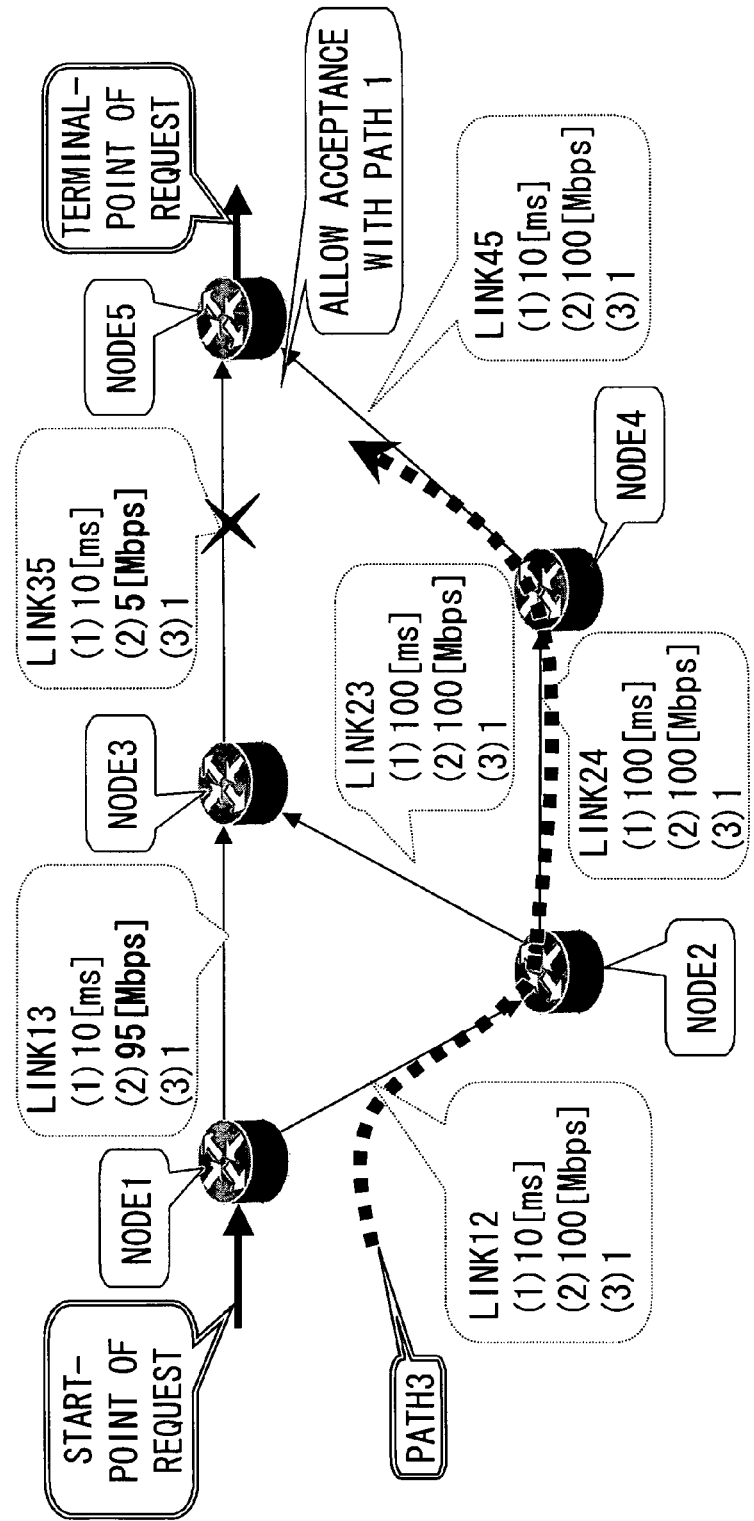
FIG. 14 is a view showing an operation example of the delay limitation minimum hop path selecting system of the conventional technique in receiving the request 2.

After the weighted values of each link are confirmed in the pre-processing, the system actually performs the path set processing using the delay time, available bandwidth, and weighted value for each link in response to the delay guarantee path setting request. Referring to FIGS. 4 and 5, the path set processing in the system according to the embodiment of the present invention will be described below based on a process flow of a flowchart of FIG. 3. FIG. 3 is a flowchart illustrative of path set processing according to this embodiment. It should be noted that the embodiment shown in FIGS. 4 and 5 is described on the assumption that the same operation example as the conventional art shown in FIGS. 10 and 11 is adapted, to aid in the understanding of the difference from the conventional art.

FIG. 4 shows an operation example of the system in receiving the delay guarantee path setting request (request 1) aiming at a path for connecting the node 1 and the node 5, which has a bandwidth of 5 Mbps and delay time of 200 ms.

The system detects, upon receiving the request 1 (S101 of FIG. 3), a path that complies with the requested bandwidth out of requested paths. More specifically, the system selects a link having an available bandwidth (value (2) of FIG. 4) larger than the requested bandwidth, 5 Mbps, out of the links for connecting between the node 1 and the node 5. In other words, at this point, the system prunes the link not having the available bandwidth equivalent to the requested bandwidth (5 Mbps) (S102 of FIG. 3). In the case of FIG. 4, there is no link insufficient in bandwidth.

Based on this, the system detects the following three paths.
Path 1: Node 1->Node 3->Node 5
Path 2: Node 1->Node 2->Node 3->Node 5
Path 3: Node 1->Node 2->Node 4->Node 5

Next, the system calculates the total delay time for each detected path, and detects a path that complies with the requested delay time of 200 ms.

In the path detecting operation, first of all, the system sums the delay times (value (1) of FIG. 4) of the respective links on each path. Regarding the path 1, the delay time of the link 13 is 10 ms and the delay time of the link 35 is 10 ms, respectively, so the total delay time equals 20 ms. Regarding the path 2, the delay time of the link 12 is 10 ms, the delay time of the link 23 is 100 ms, and the delay time of the line 35 is 10 ms, respectively, so the total delay time equals 120 ms. Similarly, the total delay time in the path 3 equals 120 ms.

Next, the system determines through detection whether or not there is a path that complies with the requested delay time of 200 ms in the request 1 (S103 of FIG. 3). In short, the system searches for a path having the total delay time for each path (path 1: 20 ms, path 2: 120 ms, path 3: 120 ms) which is shorter than the requested delay time of 200 ms. To elaborate, all the paths (paths 1 to 3) comply with the requested delay time (S103 of FIG. 3; YES), and thus all the paths are detected.

Finally, the system selects one path while taking into account cost values (values (4) of FIG. 4) defined for each link, among the paths detected through the aforementioned processings.

In this embodiment shown in FIG. 4, the weighted value (value (3) of FIG. 4) for each link is determined as the cost value as it is (S104 of FIG. 3).

It should be noted that, in another embodiment where a value obtained by dividing the weighted value of the link by the available bandwidth of the link is set as a cost value, the cost value of the link 13 may be set as follows: 100 (weighted value)/100 (available bandwidth)=1.

Upon final selection of a path, the system sums the cost values for each path that complies with the requested delay (hereinafter, referred to as total cost value). More specifically, regarding the path 1, the cost value of the link 13 is 100 and the cost value of the link 35 is 100, so the total cost value equals 200. Regarding the path 2, the cost value of the link 12 is 0, the cost value of the link 23 is 0, and the cost value of the link 35 is 100, respectively, so the total cost value equals 100. Similarly, the total cost value of the path 3 equals 0.

Then, the system selects a path having the minimum cost value thus calculated (S105 of FIG. 3). To elaborate, the system selects the path 3 and allows acceptance of the delay guarantee path setting request. Then, the bandwidth corresponding to the requested bandwidth of 5 Mbps is reserved in the link 12, link 24, and link 45 on the path 3, and those links decrease their available bandwidths (S106 of FIG. 3). Here, if there is no path that complies with the requested delay time (S103 of FIG. 3; NO), the delay guarantee request concerned is judged unacceptable (S107 of FIG. 3).

In this way, the system selects a path having the minimum cost value as well as complying with the requested bandwidth (5 Mbps) and requested delay (200 ms or shorter).

Referring to FIG. 5, description will be given below of an operation of the system in receiving, thereafter, the delay guarantee path setting request (request 2) aiming at a path for connecting the node 1 and the node 5, which has a bandwidth of 10 Mbps and delay time of 50 ms or shorter. FIG. 5 shows an operation example of the system in receiving the request 2 in a state where the bandwidth of the path 3 is secured in the embodiment shown in FIG. 4.

When receiving the request 2 in the aforementioned state (S101 of FIG. 3), the system detects, as in the case of receiving the request 1, a path that complies with the requested bandwidth out of the requested paths. That is, the system selects a link having the available bandwidth (value (2) of FIG. 5) larger than the requested bandwidth of 10 Mbps among the links for connecting the node 1 and the node 5. In other words, at this point, the system counts out a link not having an available bandwidth equivalent to the requested bandwidth (10 Mbps) (S102 of FIG. 3). In the case of FIG. 5, there is no link insufficient in bandwidth.

Based on this, the system detects the following three paths.
Path 1: Node 1->Node 3->Node 5
Path 2: Node 1->Node 2->Node 3->Node 5
Path 3: Node 1->Node 2->Node 4->Node 5

Next, the system calculates the total delay time for each detected path, and detects a path that complies with the requested delay time of 50 ms or shorter.

An operation of the system at the time of detecting the path is similar to the aforementioned operation of receiving the request 1. The total delay time in the path 1 is 20 ms, the total delay time in the path 2 is 120 ms, and the total delay time in the path 3 is 120 ms.

Next, the system determines, through detection, whether or not there is a path that complies with the requested delay time of 50 ms in the request 2. In short, the system detects the path 1 (S103 of FIG. 3; YES).

Finally, the system selects one path while taking into account cost values (values (4) of FIG. 5) defined for each link, among the paths detected through the aforementioned processings. This final path selecting operation is similar to the foregoing operation of receiving the request 1.

That is, the system sums the cost values for each path that complies with the requested delay and selects a path having the minimum cost value thus calculated. In this embodiment, the path 1 is only detected, so the path 1 is continuously selected (S105 of FIG. 3), allowing acceptance of requests. Then, the requested bandwidth of 10 Mbps is reserved for each of the link 13 and link 35 on the path 1, and those links decrease their available bandwidths (S106 of FIG. 3).

<Operational Effect of the Embodiment>

In the system according to this embodiment, the weighted values are previously defined for the respective links connecting between the nodes. In defining the weighted values for each link, the system selects a minimum delay path among the paths from the start-point node to the terminal-point node.

Next, the link as a target of weighted value calculation is counted out, and a minimum delay path is detected again out of the paths from the start-point node to the terminal-point node. After that, a difference in total delay time between the two minimum delay paths is set as the weighted value of the target link, and all values in every combination of the start-point nodes and the terminal-point nodes are summed and set as the objective weighted value.

As mentioned so far, in this embodiment, the weighted value is defined for each link as the ability to meet the delay guarantee path setting request, and the path selection/setting are effected using the weighted value. Thus, it is possible to define the cost values for each link according to an ability to meet a prospective delay request. This makes it possible, in turn, to make efficient use of the network resources, and reduce a call loss probability to accept as many the delay guarantee path setting requests as possible.

APPLIED EXAMPLE

In this example, the system is applied to another network configuration (model), and simulation is carried out. The simulation results are explained with reference to FIGS. 6 and 7. This simulation includes one in the case where the conventional system is applied to the same network model as well, and effects are compared against those of the present invention.

Figure 6:
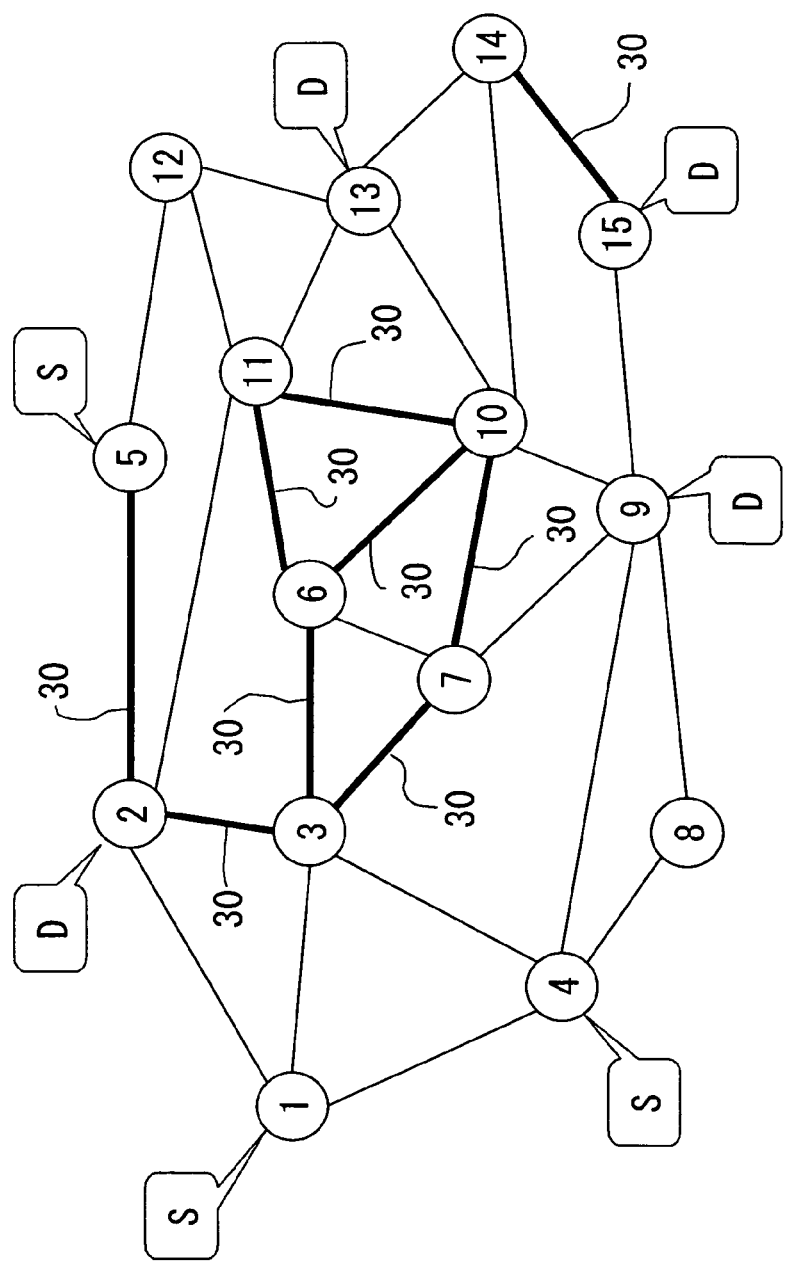
FIG. 6 is a view showing a network configuration in an applied example of the present invention used for simulation.

FIG. 6 shows a network configuration used in the simulation. Fifteen nodes are connected to one another to constitute the network. The bandwidth of each link 30 denoted by the thick line out of the links connecting between the nodes is 2.4 Gbps, the bandwidth of the rest is 600 Mbps.

Prior to the simulation, values related to the path set processing are set as follows.

A delay time for each link is selected and set from a range of 1 to 50 ms at random.

Also, the start-point node in each delay guarantee path setting request is randomly selected from the nodes 1, 4, and 5 (denoted by S in the figure), while the terminal-point node is randomly selected from nodes 2, 9, 13, and 15 (denoted by D in the figure). The requested bandwidth and delay time are selected from a range of 50 to 100 Mbps and from a range of 50 to 150 ms at random, respectively. An issuance interval and retention time of the delay guarantee path setting request are both based on exponential distribution; an average retention time is set to 3600 s and an average issuance interval is changed.

Figure 7:
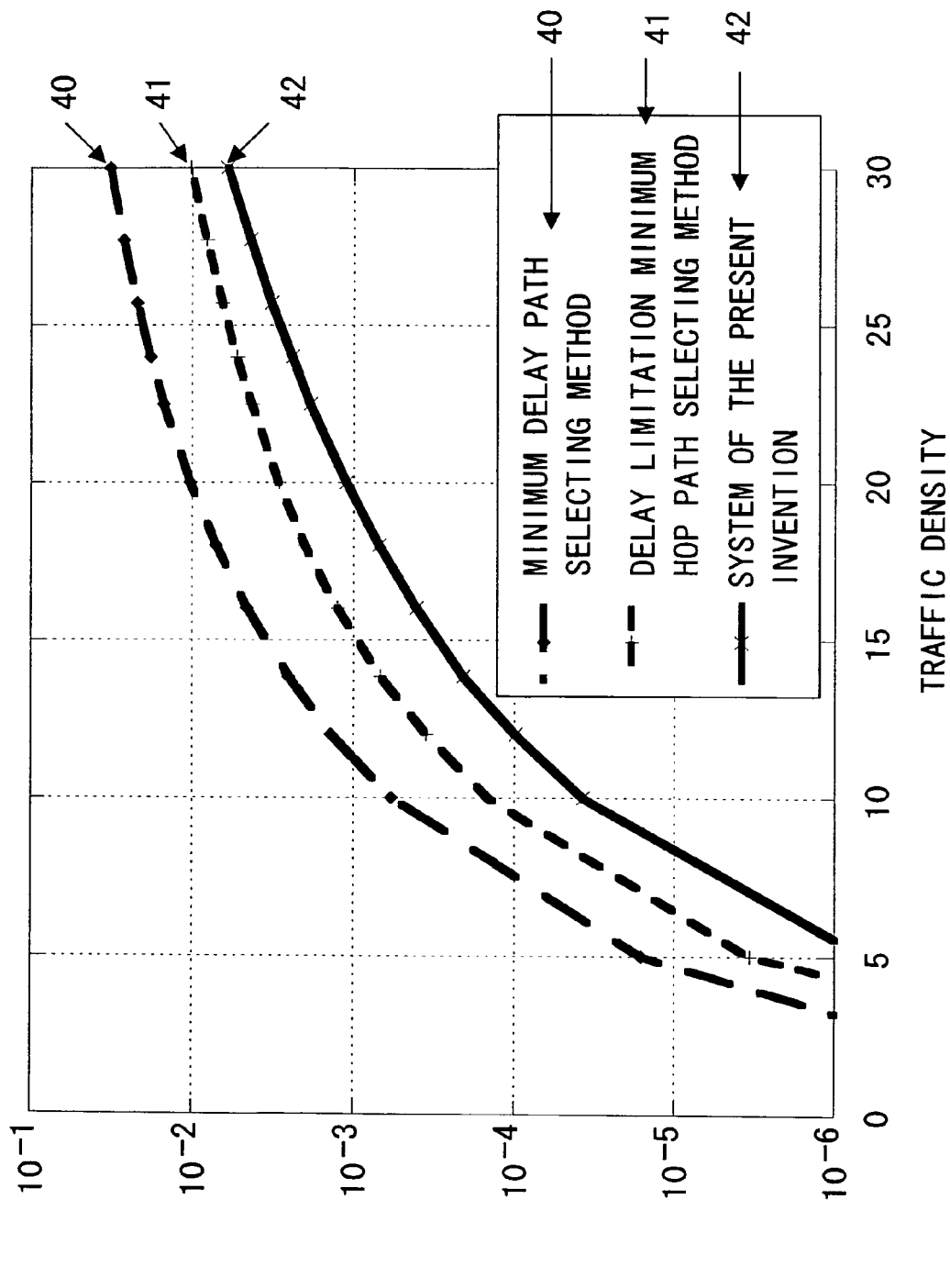
FIG. 7 is a graph illustrative of a call loss probability against a traffic density in the applied example of the present invention as simulation results.

FIG. 7 is a graph illustrative of a call loss probability against a traffic density as a simulation result. The horizontal axis represents the traffic density that is defined as a value obtained by dividing the average retention time by the average issuance interval. The call loss probability corresponds to a ratio of requests judged unacceptable to issued requests. Shown in the graph of FIG. 7 are data 40 indicating the call loss probability of the minimum delay path selecting method (conventional system 1), data 41 indicating the call loss probability of the delay limitation minimum hop path selecting method (conventional system 2), and data 42 indicating the call loss probability of the system.

As apparent from FIG. 7, for example, if the traffic density is 20, the call loss probabilities of the minimum delay path selecting method (conventional system 1), the delay limitation minimum hop path selecting method (conventional system 2), and the system are about $10^{-2}$, about $3 \times 10^{-3}$, and about $10^{-3}$, respectively. More specifically, assuming that 10,000 requests are issued, the numbers of requests judged unacceptable in the minimum delay path selecting method, the delay limitation minimum hop path selecting method, and the system of the present invention are 100, 30, and 10, respectively.

Accordingly, it will be understood that the system can considerably decrease the number of delay guarantee path setting requests judged unacceptable as compared with the conventional systems.

As set forth so far, upon searching the delay guarantee path, the usability of network resources drops with the conventional art of detecting the minimum delay path or detecting the minimum cost path with the cost values set constant. According to the present invention, the cost value for each link is defined according to an ability to meet a prospective delay request. Consequently, it is possible to make efficient use of network resources and reduce the call loss probability to accept more requests than the conventional arts.

MODIFIED EXAMPLE

In the embodiment of the present invention, the network management control device (NMS 51) is connected to the objective network through a given management network to thereby manage the information about the respective nodes and links constituting the network, and perform path setting in receiving the delay guarantee path setting request. This function may be imparted to each node that may serve as start-point node/terminal-point node out of the nodes constituting the network. Also, all the nodes that constitute the network can serve as the start-point node/terminal-point node. Besides, the nodes that can serve as the start-point node/terminal-point node may be communication apparatuses such as routers and so on.

Also, in the embodiment of the present invention, in response to the delay guarantee path setting request, all paths that comply with the requested bandwidth and requested delay are detected, and the total cost values are calculated for every path. However, another calculating method such as linear programming may be adopted, which is more efficient in obtaining the optimum value.

Further, in the embodiment of the present invention, the weighted value for each link is used as a cost value as it is; however, it is possible to set as a cost value, a value obtained by dividing the weighted value of each link by the available bandwidth of the link concerned such that the link with the smaller available bandwidth is less likely to be selected.

In addition, in the embodiment of the present invention, upon final path selection, the sum of cost values is calculated for each path, and the path having the minimum cost value thus calculated is selected. However, a predetermined threshold value may be previously stored in a storage device and used to select a path. In this case, a path having a cost value most approximate to the threshold value may be selected, for instance.

What is claimed is:

1. A network management apparatus, being provided to a network including a plurality of nodes, setting a traffic transfer path based on a delay guarantee message requesting a path setting to guarantee a bandwidth and a delay in a segment connecting two of the plurality of nodes, the network management apparatus comprising:

a pre-process section defining a weighted value for each of one or more links connecting between the plurality of nodes according to a difference between a total delay of a minimum delay path of paths in the segment connecting two of the plurality of nodes and a total delay of a minimum delay path in the segment connecting two of the plurality of nodes exclusive of a target link in the segment;

wherein the pre-process section defines a sum of the difference calculated on each of segments formed between every possible combination of two in the plurality of nodes as the weighted value for each of the links;

a link information storage section storing the delay, the available bandwidth, and the weighted value for each of the links; and a path setting section selecting, upon receiving the delay guarantee message, a path complying with the segment, the requested delay, and the requested bandwidth in the received delay guarantee message, and having the links of the weighted value to meet a predetermined condition, and setting the path as the traffic transfer path.

2. The network management apparatus according to claim 1, the path setting section further comprising a cost value calculating section calculating a cost value by dividing the weighted value for each of the links by the available bandwidth of each of the links, selecting, upon receiving the delay guarantee message, a path to comply with the segment, the requested delay, and the requested bandwidth in the received delay guarantee message, the path having the minimum sum of the cost values of the links in the path, and setting the path as the traffic transfer path.

3. The network management apparatus according to claim 1, wherein the predetermined condition corresponds to the condition making the sum of the weighted values of the links in the path become minimum.

4. A delay guarantee path setting method for setting a traffic transfer path in a network where a plurality of nodes are connected, based on a delay guarantee message requesting a path setting to guarantee a bandwidth and a delay in a segment connecting two of the plurality of nodes, the delay guarantee path setting method comprising the steps of:
    defining a weighted value for each of links connecting between the plurality of nodes according to a difference between a total delay of a minimum delay path of paths in the segment connecting two of the plurality of nodes and a total delay of a minimum delay path in the segment connecting two of the plurality of nodes exclusive of target link in the segment;
    wherein the step of defining the weighted value defines sum of the difference calculated on each of segments formed between every possible combination of two in the plurality of nodes as the weighted value for each of the links;
    storing the delay, the available bandwidth, and the weighted value for each of the links; and
    selecting, upon receiving the delay guarantee message, a path complying with the segment, the requested delay, and the requested bandwidth in the received delay guarantee message, and having the links of the weighted value to meet a predetermined condition to set the path as the traffic transfer path.

5. The delay guarantee path setting method according to claim 4, the step of setting the traffic transfer path further comprising the step of calculating a cost value by dividing the weighted value for each of the links by the available bandwidth of each of the links,
    selecting, upon receiving the delay guarantee message, a path to comply with the segment, the requested delay, and the requested bandwidth in the received delay guarantee message, the path having the minimum sum of the cost values of the links in the path, and
    setting the path as the traffic transfer path.

6. The delay guarantee path setting method according to claim 4, wherein the predetermined condition corresponds to the condition making the sum of the weighted values of the links in the path become minimum.

7. A computer readable recording medium having a program stored therein for causing a computer to execute a delay guarantee path setting method for setting a traffic transfer path in a network where a plurality of nodes are connected, based on a delay guarantee message requesting a path setting to guarantee a bandwidth and a delay in a segment connecting two of the plurality of nodes, the delay guarantee path setting method comprising the steps of:
    defining a weighted value for each of one or more links connecting between the plurality of nodes according to a difference between a total delay of a minimum delay path of paths in the segment connecting two of the plurality of nodes and a total delay of a minimum delay path in the segment connecting two of the plurality of nodes exclusive of a target link in the segment;
    wherein the step of defining the weighted value defines sum of the difference calculated on each of segments formed between every possible combination of two in the plurality of nodes as respectively the weighted value for the each of the links ti~ in every segment in the network as a result of the weighted value, sums each of the result of the weighted value, and sets the sum as the weighted value for the link;
    storing the delay, the available bandwidth, and the weighted value for each of the links; and
    selecting, upon receiving the delay guarantee message, a path complying with the segment, the requested delay, and the requested bandwidth in the received delay guarantee message, and having the links of the weighted value to meets a predetermined condition to set the path as the traffic transfer path.

8. The computer readable recording medium having the program stored therein for causing the computer to execute the delay guarantee path setting method according to claim 7, wherein the step of setting the traffic transfer path further comprising the step of calculating a cost value by dividing the weighted value for each of the links by the available bandwidth of each of the links,
    selecting, upon receiving the delay guarantee message, a path to comply with the segment, the requested delay, and the requested bandwidth in the received delay guarantee message, the path having the minimum sum of the cost values of the links in the path, and
    setting the path as the traffic transfer path.

9. The computer readable recording medium having the program stored therein for causing the computer to execute the delay guarantee path setting method according to claim 7, wherein the predetermined condition corresponds to the condition making the sum of the weighted values of the links in the path become minimum.

* * * * *

UNITED STATES PATENT AND TRADEMARK OFFICE
CERTIFICATE OF CORRECTION

PATENT NO. : 7,496,039 B2
APPLICATION NO. : 11/031567
DATED : February 24, 2009
INVENTOR(S) : Hitoshi Yamada et al.

It is certified that error appears in the above-identified patent and that said Letters Patent is hereby corrected as shown below:

Column 16, line 20: "for the each of the links ti~ in every" should be changed to --for the each of the links in every--; and line 30, "value to meets a predetermined" should be changed to --value to meet a predetermined--.

Signed and Sealed this

Twenty-second Day of June, 2010

David J. Kappos
*Director of the United States Patent and Trademark Office*